(12) United States Patent
Reutlinger

(10) Patent No.: US 8,922,086 B2
(45) Date of Patent: Dec. 30, 2014

(54) ELECTRIC MACHINE HAVING A HYBRID-EXCITED ROTOR

(75) Inventor: Kurt Reutlinger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 12/602,915

(22) PCT Filed: May 8, 2008

(86) PCT No.: PCT/EP2008/055672
§ 371 (c)(1),
(2), (4) Date: Apr. 16, 2010

(87) PCT Pub. No.: WO2008/148621
PCT Pub. Date: Dec. 11, 2008

(65) Prior Publication Data
US 2010/0207480 A1  Aug. 19, 2010

(30) Foreign Application Priority Data
Jun. 4, 2007 (DE) .......................... 10 2007 025 971

(51) Int. Cl.
 *H02K 21/04* (2006.01)
(52) U.S. Cl.
 CPC .................................. *H02K 21/042* (2013.01)
 USPC ....................... 310/181; 310/156.53; 310/191
(58) Field of Classification Search
 CPC .................................................... H02K 21/042
 USPC ..................................... 310/181, 156.53, 191
 See application file for complete search history.

(56) References Cited

U.S. PATENT DOCUMENTS

| 3,555,327 | A | * | 1/1971 | Terry | 310/168 |
| 4,015,189 | A | * | 3/1977 | Gorden | 322/46 |
| 4,745,312 | A | * | 5/1988 | Nagasaka | 310/49.55 |
| 4,882,515 | A | * | 11/1989 | Radomski | 310/263 |
| 4,959,577 | A | * | 9/1990 | Radomski | 310/263 |
| 4,980,595 | A | * | 12/1990 | Arora | 310/263 |

(Continued)

FOREIGN PATENT DOCUMENTS

| EP | 0 741 444 | 11/1996 |
| FR | 2 856 532 | 12/2004 |

(Continued)

OTHER PUBLICATIONS

International Search Report for PCT/EP2008/055672, dated Oct. 28, 2008.

(Continued)

*Primary Examiner* — Alex W Mok
(74) *Attorney, Agent, or Firm* — Kenyon & Kenyon LLP

(57) ABSTRACT

A synchronous electric machine having a fixed stator, a multi-phase stator winding and having a rotor which has poles, excited in a predefined sequence, over its circumference, the number of poles being changeable as a function of the intensity and the direction of a field current in at least one field coil of the rotor. For improving the efficiency of the machine and for reducing the number of field coils and the entire coil cross section it is provided that the rotor has a laminated core, laminated in the axial direction, which has grooves on the circumference for accommodating the at least one field coil and that the at least one field coil is situated on the circumference of the rotor with a step size which corresponds to the pole pitch of the lower number of poles.

31 Claims, 9 Drawing Sheets

(56) References Cited

U.S. PATENT DOCUMENTS

| | | | | |
|---|---|---|---|---|
| 5,132,581 | A * | 7/1992 | Kusase | 310/263 |
| 5,177,391 | A * | 1/1993 | Kusase | 310/263 |
| 5,397,975 | A * | 3/1995 | Syverson | 322/46 |
| 5,502,368 | A * | 3/1996 | Syverson et al. | 322/28 |
| 5,663,605 | A * | 9/1997 | Evans et al. | 310/181 |
| 5,753,989 | A * | 5/1998 | Syverson et al. | 310/114 |
| 5,955,807 | A * | 9/1999 | Kajiura et al. | 310/156.66 |
| 6,072,257 | A * | 6/2000 | Akemakou | 310/191 |
| 6,147,429 | A * | 11/2000 | Akemakou et al. | 310/181 |
| 6,236,134 | B1 * | 5/2001 | Syverson | 310/181 |
| 6,271,613 | B1 * | 8/2001 | Akemakou et al. | 310/181 |
| 6,548,931 | B2 * | 4/2003 | Liang et al. | 310/156.07 |
| 6,756,870 | B2 * | 6/2004 | Kuwahara | 335/224 |
| 6,853,112 | B2 * | 2/2005 | Nakamura et al. | 310/263 |
| 7,116,020 | B2 * | 10/2006 | Armiroli et al. | 310/68 D |
| 2005/0006973 | A1 * | 1/2005 | Bradfield et al. | 310/180 |
| 2005/0189828 | A1 * | 9/2005 | Nakayama et al. | 310/71 |
| 2006/0071562 | A1 * | 4/2006 | Sakamoto et al. | 310/49 R |
| 2006/0119206 | A1 * | 6/2006 | Akemakou | 310/181 |
| 2006/0208594 | A1 * | 9/2006 | Kashihara et al. | 310/179 |
| 2007/0090713 | A1 | 4/2007 | Arkita et al. | |
| 2007/0296289 | A1 * | 12/2007 | Wolf et al. | 310/68 D |

FOREIGN PATENT DOCUMENTS

| | | |
|---|---|---|
| JP | 59-169560 | 11/1984 |
| JP | 2005-536176 | 11/2005 |
| JP | 2006-311665 | 11/2006 |
| JP | 2007-37284 | 2/2007 |
| JP | 2007-124755 | 5/2007 |
| JP | 2010-510720 | 4/2010 |
| WO | WO 99/67871 | 12/1999 |
| WO | WO 2004/017496 | 2/2004 |

OTHER PUBLICATIONS

Luo, Xiaogang, et al., "A Synchronous/Permanent Magnet Hybrid AC Machine", IEEE Transactions on Energy Conversion, vol. 15, No. 2, 2000, pp. 203-210.

Viorel, I.A., et al., "On the Possibility to Use a Hybrid Synchronous Machine as an Integrated Starter-Generator", IEEE, International Conference on Industrial Technology, 2006, pp. 1195-1200.

* cited by examiner

ELECTRIC MACHINE HAVING A HYBRID-EXCITED ROTOR

FIELD OF THE INVENTION

The present invention relates to an electric machine having a fixed stator and a hybrid-excited rotor.

BACKGROUND INFORMATION

Synchronous machines of this type are suitable for operation on a fixed power system, e.g., a fixed three-phase system, as well as for operation via an electronic converter. Moreover, machines of this type are suitable in generator operation for regulating the induced voltage in a multi-phase stator winding system as they are needed in electrical systems of motor vehicles, for example. In these electric machines, the poles on the circumference of the rotor are excited partly by permanent magnets and partly electrically.

Pole-changing synchronous machines are discussed in WO 2004/017496 in which pole-changing of the rotor takes place by changing the direction of the current in the field coils of the rotor, this change being used for controlling the output voltage of a multi-phase stator winding. By continuously regulating the field current, the output voltage of the multi-phase stator winding, which is dimensioned for the higher number of poles, may be influenced in a wide range. For example, three radially magnetized permanent magnets and three field coils are needed in a system which is reversible between twelve and six poles according to FIGS. 1a and 1b, the field coils, having a step size from a pole pitch of the higher number of poles, are each situated on a shank, which is radially oriented to the circumference. The disadvantage here is that, for a symmetrical pole arrangement, one field coil for an appropriate magnetomotive force is needed for each permanent magnet. This requires a correspondingly large copper cross section and takes up plenty of space on the rotor. It is also disadvantageous that the permanent magnets on the rotor circumference have the same polarity which complicates their magnetization in the installed state since the magnetic reflux must take place via adjacent poles.

Additional specific embodiments of synchronous machines of this type are discussed in WO 99/67871. There, however, the permanent magnets in the rotor are positioned in the radial direction and are magnetized in a chord-like manner. Here also, field coils between the permanent magnets, which have a step size from a pole pitch of the higher number of poles, are situated on a shank which runs radially to the circumference. Likewise, the number of field coils is equal to the number of permanent magnets in a symmetrical pole arrangement; all field coils must be designed for the full magnetomotive force. For a machine having a twelve-pole rotor, even four field coils having a correspondingly large copper cross section are needed and require plenty of space. It is disadvantageous here also that complete magnetization of the permanent magnets in the installed state on the rotor is almost impossible because the interior areas of the permanent magnets are not reached to the full extent by a magnetizing head on the rotor circumference.

A multi-phase electric machine having a pole-changing, hybrid-excited rotor is known from US 2007/0090713 A1 which is used in motor vehicles during engine operation for starting the vehicle drive as well as during generator operation for supplying power to the vehicle electrical system. For optimizing this double function, the stator winding of the machine has a number of poles which corresponds to the smaller number of poles of the pole-changing rotor. In addition, the star-connected stator winding is provided with a star point coupling of the downstream bridge rectifier for reducing the machine's electromagnetic losses, whereby the ripple factor of the electromotive force is decreased during generator operation.

SUMMARY OF THE INVENTION

The present approach is intended to provide an electric machine, which may be for generator operation, to keep the electromagnetic losses low without additional circuitry, and, at the same performance level of the electric machine, to reduce the overall required cross section for the field coils of the rotor and thus to reduce the amount of copper, the space needed, and the power requirement for the electrical excitation.

Electric machines having a hybrid-excited stator have the advantage that, by using the laminated core, the electromagnetic losses, which occur in particular in the rotor due to magnetic harmonics, are largely avoided using simple means and that, in contrast to the related art, with the aid of a multiple step size of the field coils the number of coils is reduced for the same coil cross section or their cross section is reduced for the same number of coils. The same performance level makes it possible to manufacture the rotor to be more cost-effective and more compact while reducing the amount of copper. A further advantage is that the permanent magnets of the rotor may now be magnetized in the installed state in the simplest manner.

Advantageous embodiments and refinements of the features specified herein arise from the measures further described herein.

For achieving an increased step size of the field coils it is essential that their winding overhangs on the faces of the laminated core pass by at least one permanent magnet, which is situated on the rotor circumference and is radially magnetized, in a chord-like manner. For dissipating the heat loss of the machine it is provided that a fan is situated on both faces of the laminated core. It is particularly advantageous with regard to the use of the electric machine as a multi-phase a.c. generator for motor vehicles when the output voltage of the stator winding may be regulatable independently of load and temperature between an admissible maximum value and the value 0 by changing the intensity and the direction of the field current in the field coils. The power output is adjusted to the instantaneous consumption in order to obtain a constant system voltage, for example. In addition, the rotor advantageously has the higher number of poles during normal operation of the machine, the intensity and the direction of the field current in the field coils being selected in such a way that, in cooperation with the permanent magnets, poles of approximately the same intensity and alternating polarity appear on the stator circumference. An increase in the field current results in an increase in the induced voltage and thus in a greater power output and vice versa.

A particularly cost-effective specific embodiment of the electric machine is achieved in that the rotor has only one field coil, inserted into grooves diametrically opposite one another, which is wound around a rotor shaft which may be split at the winding overhangs and cooperates with at least two permanent magnets situated between the grooves on the rotor circumference and diametrically opposite one another. Two permanent magnets of alternating radial polarity are advantageously situated offset by 90° with respect to the two grooves of the field coil. In a refinement of the exemplary embodiments and/or exemplary methods of the present invention, it is proposed for a higher number of pole pairs that four permanent magnets are situated on the rotor circumference, two permanent magnets between the grooves having the same radial polarity and an approximately similar distance to one another and to the grooves. An even greater number of pole pairs may advantageously be achieved in that six permanent magnets are situated on the rotor circumference, three magnets between the grooves having an alternating polarity and an approximately similar distance to one another and to the grooves.

A particularly advantageous specific embodiment for generators in motor vehicles results from the fact that the rotor has at least two, which may be four, field coils which are inserted into four grooves, each offset with respect to one another by 90°, and which cooperate with at least four permanent magnets of alternating radial polarity situated between the grooves on the rotor circumference. The four permanent magnets advantageously have a circumferential distance to the adjacent grooves which corresponds to the circumferential width of the magnets so that with an appropriate field current in the field coils on the rotor circumference the number of poles is changeable from four poles to twelve poles.

For optimizing the machine for generator operation, it is also important that the number of poles of the multi-phase stator winding corresponds to the higher number of poles of the changeable rotor. In the simplest case, the stator winding has a three-phase design and is connected to the input of a bridge rectifier via a star or delta connection. A better efficiency of the stator due to a reduced ripple factor of the output voltage is achieved when the stator winding has a five-phase design and is connected to the input of a bridge rectifier via a star connection, a ring connection, or a star-series connection. It is advantageous for machines having a greater power output when the stator winding has a six-phase design and is connected to the input of a bridge rectifier via a double-star connection or a double-delta connection.

In a refinement of the exemplary embodiments and/or exemplary methods of the present invention, the changeability of the number of poles of the rotor may be used to regulate the output voltage down to the value zero by connecting the output of the bridge rectifier to a regulator whose output is connected to the at least one field coil (18) of rotor (11), the regulator being able to change the intensity and the direction of the field current as a function of the output voltage across the bridge rectifier.

The exemplary embodiments and/or exemplary methods of the present invention are explained in greater detail as an example in the following based on the figures.

DETAILED DESCRIPTION

Figure 1:
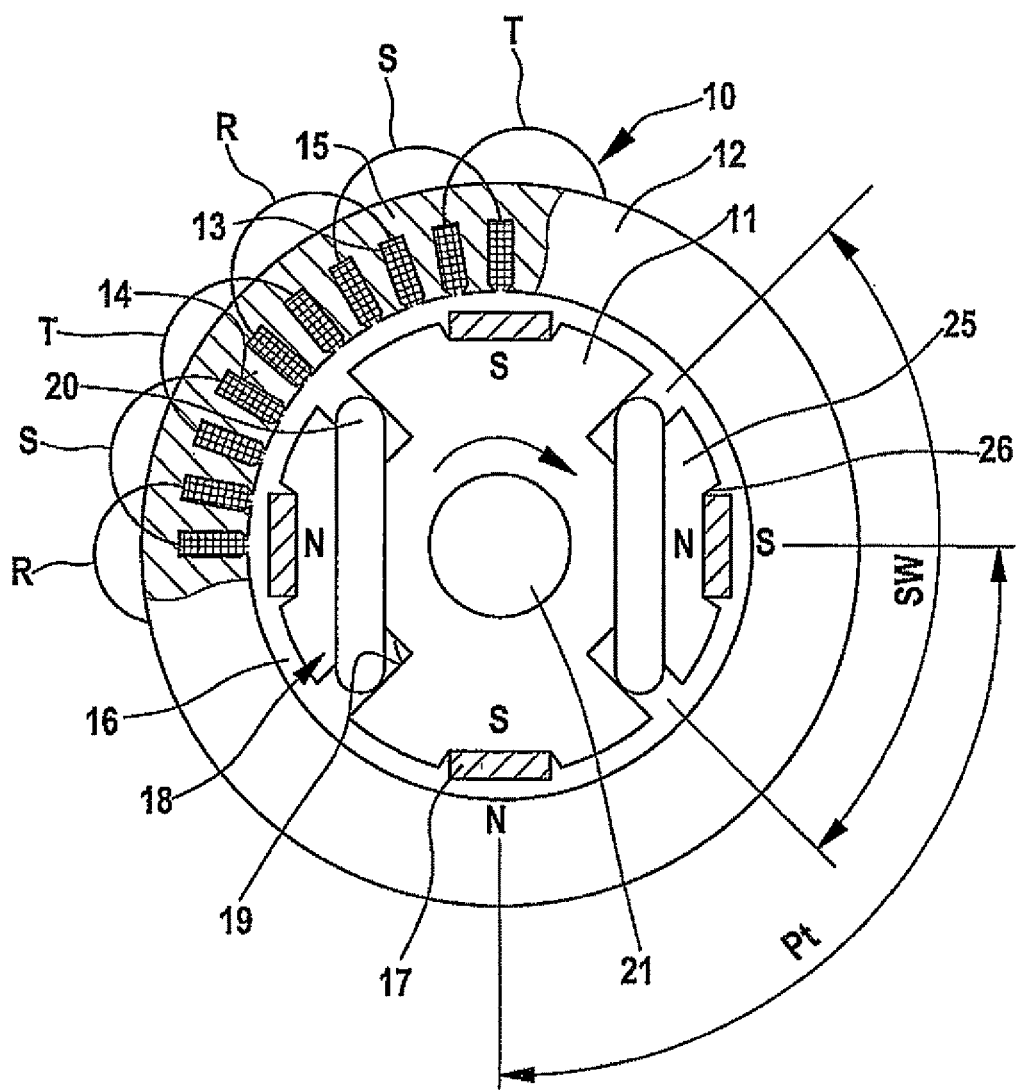
FIG. 1 shows a schematic representation in cross section of an electric machine according to the present invention having a hybrid-excited rotor.
Figure 2:
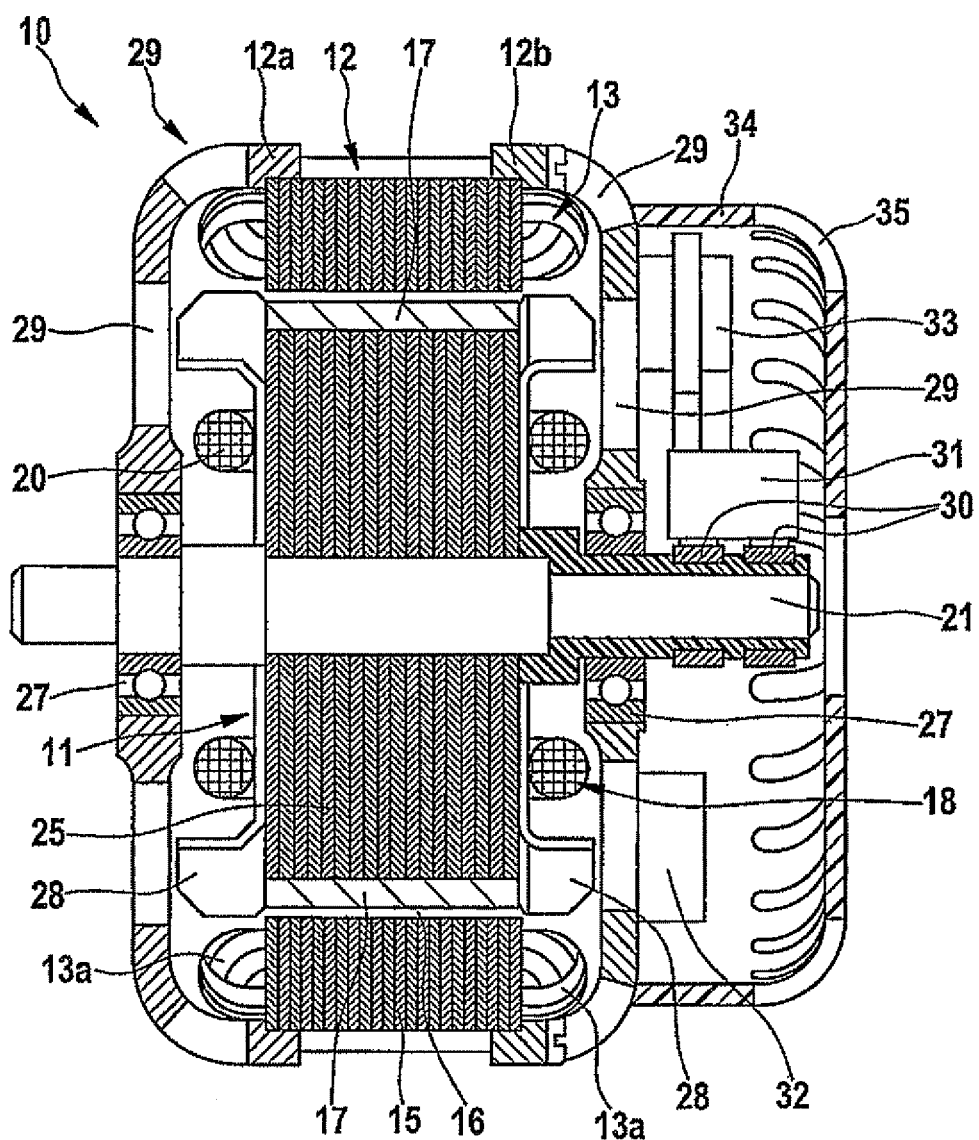
FIG. 2 shows the machine in a longitudinal section.

FIGS. 1 and 2 show an electric machine in simplified form in cross section and longitudinal section, and labeled with reference numeral 10 which, as a synchronous machine, is equipped with a hybrid-excited rotor 11. The machine has a fixed stator 12 which carries a three-phase stator winding 13. In the first exemplary embodiment according to FIGS. 1 through 3, electric machine 10 is a three-phase generator for motor vehicles having a twelve-pole stator winding 13 whose three phase windings R, S, and T are inserted into grooves 14 of a laminated stator core 15 having a coil step size of three grooves and are shown in FIG. 1 across part of the circumference. Stator 12 cooperates, via an operating air gap 16, with rotor 11 which is rotatably supported in stator 12. Rotor 11 has multiple north poles and south poles N and S in a predefined sequence over its circumference, which are formed by permanent magnets 17 and by field coils 18. The number of poles of rotor 11 may be changed as a function of the intensity and the direction of a field current in field coils 18. As is apparent in FIG. 2, the core of rotor 11 is a laminated core 25 which is laminated in the axial direction and mounted on the central area of rotor shaft 21. For receiving field coils 18, open grooves 19 are punched out on the outer circumference of laminated core 25. Permanent magnets 17 are inserted into punched-out pockets 26 in laminated core 25. Pockets 26 may be closed on the outside, so that magnets 17 are axially inserted therein (see FIG. 6). The geometric form of pockets 26 makes it possible to absorb the centrifugal forces, thereby ensuring a secure fit of magnets 17 on rotor 11. The magnet material may be composed of rare earths. Laminated core 25 may be held together by welds. However, rivets, adhesives (self-bonding varnish), or crimpings may also be used instead.

The housing of the machine is made up of two end shields 12a and 12b between which laminated stator core 15 is clamped. Rotor 11 together with its rotor shaft 21 is rotatably placed on end shields 12a, 12b via bearings 27. A fan 28 is attached to each of the axial faces of laminated core 25. Cooling air is axially aspirated in by fans 28 via openings 29 in end shields 12a, 12b and finally radially blown outside along winding overhangs 13a of stator winding 13, as well as rotor 11 and stator 12. A slip-ring arrangement 30 for transferring the field current from stator 12 to rotor 11 is mounted on the rear end of rotor shaft 21 behind end shield 12b which cooperates with a fixed brush device 31 for supplying field coils 18 with power. As the power supply unit for rotor 11, brush device 31 together with a regulator 32 and a bridge rectifier 33 is mounted outside on rear end shield 12b. These components are covered by protective cap 34 which has several venting slots 35 on the face for the inflow of cooling air.

Figure 3:
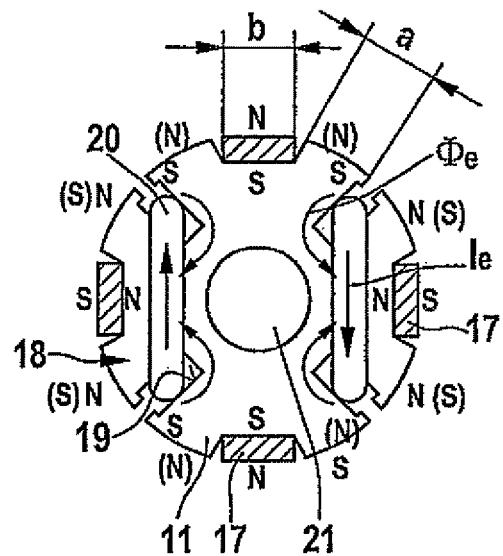
FIG. 3 shows the rotor in cross section having four permanent magnets and two controllable field coils.

FIG. 3 shows the pole sequence on the circumference of rotor 11 which results from a field current Ie flowing in the arrow direction through field coils 18. Two field coils 18 are inserted into four grooves 19 of rotor 11 which are offset to one another by 90° and oriented toward the circumference of rotor 11. Four permanent magnets 17 are situated on the rotor circumference between grooves 19 which cooperate with field coils 18 at alternating radial polarity. The direction of field current Ie shown in FIG. 3 results in twelve poles of alternating polarity on the rotor circumference. Due to the reversal of the direction of current in field coils 18, the number of poles of rotor 11 may be changed, because the changeover of the electrically excited field Φe causes the poles on both sides of each groove 19 on the rotor circumference to change their polarity which is made clear in FIG. 3 by the polarity shown in parentheses. This results now in a four-pole arrangement on the rotor circumference having an alternating symmetrical polarity.

According to the exemplary embodiments and/or exemplary methods of the present invention, the reduction in the number of field coils 18 is achieved in that field coils 18 are situated on the circumference of rotor 11 at a step size SW which, according to FIG. 1, corresponds to pole pitch Pt of the smaller number of poles of rotor 11—here therefore to the four-pole design. This step size, several times greater compared to the related art, is achieved in that winding overhangs 20 of field coils 18 on the faces of rotor 11 are passing in a chord-like manner below one of the radially magnetized permanent magnets 17 situated on the rotor circumference. In normal operation of electric machine 10, the intensity and the direction of field current Ie in field coils 18 is selected in such a way that, in cooperation with permanent magnets 17, the rotor has the higher number of poles and poles of approximately the same intensity and alternating polarity appear on the rotor circumference. For this purpose it is also provided that the four permanent magnets 17 have a circumferential distance a to the adjacent grooves 14 according to FIG. 3, which corresponds to circumferential width b of the magnets.

Figure 4A:
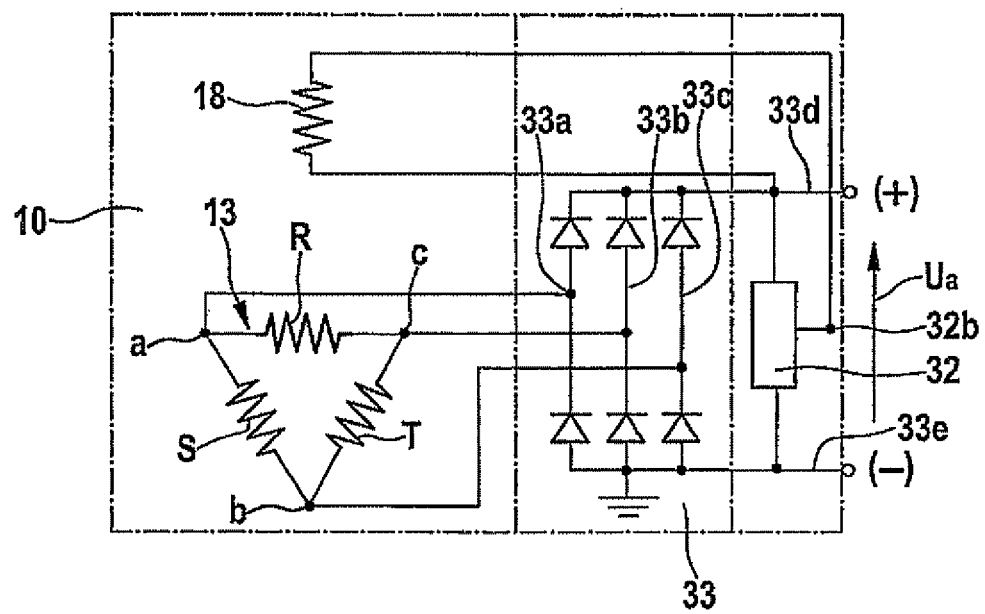
FIG. 4a and FIG. 4b show the circuit wiring of the machine including a rectifier and a regulator in two variants.

FIG. 4a shows the electrical circuit wiring of machine 10. The three phases R, S, and T of stator winding 13 are connected to one another via a delta connection and their three outputs a, b, and c are each connected to a bridge input 33a, 33b, 33c of bridge rectifier 33. At its output 33d, 33e, bridge rectifier 33 is connected to regulator 32 for regulating output voltage Ua. One end of field coil 18 is connected to the plus potential of bridge rectifier output 33d and its other end to output 32b of regulator 32 to influence the field current as a function of output voltage Ua.

Figure 4B:
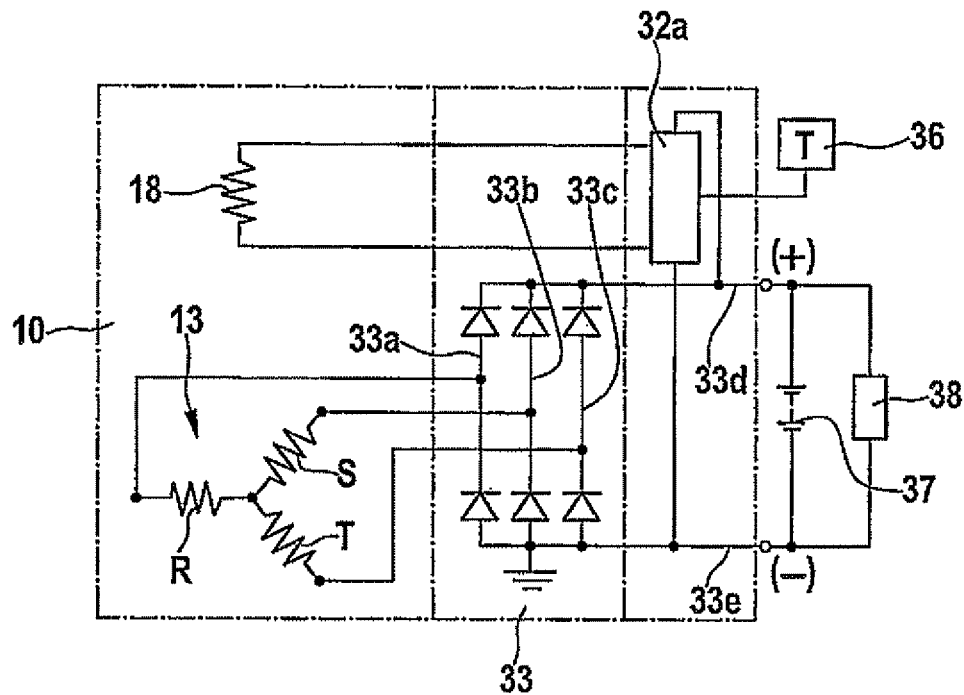

As a variant to the circuit according to FIG. 4a, FIG. 4b shows a three-phase stator winding 13 in a star connection as well as a regulator 32a having a two-pole output 32b, 32c to which field coil 18 of machine 10 is connected. Using this regulator 32a, the intensity as well as the direction of the field current may be changed as a function of output voltage Ua. Moreover, regulator 32a is provided with a temperature sensor 36 via which output voltage Ua may be readjusted as a function of the temperature of machine 10. During operation of machine 10 in the motor vehicle, an accumulator 37 for supplying power to the motor vehicle electrical system 38 is recharged via output 33d, 33e of bridge rectifier 33.

Figure 5:
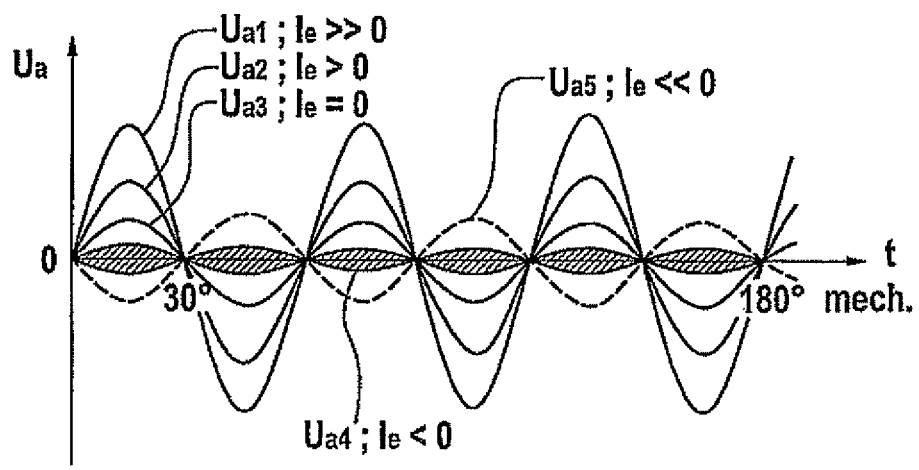
FIG. 5 shows in a diagram the curve of the output voltage of the machine in generator operation as a function of the field current.

With the aid of FIG. 5 it is now explained in greater detail that, using the circuit according to FIG. 4b, output voltage Ua of stator winding 13 of the three-phase generator according to FIGS. 1 and 2 may be regulatable as a function of load and temperature between a permissible maximum value and the value 0 by changing the intensity and the direction of field current Ie in field coils 18. The curve of output voltage Ua, dependent on field current Ie, of one phase of the machine over a half-rotation of rotor 11 (180° mechanically) is plotted against time axis t. In the case of the twelve-pole, three-phase stator winding 13, a half-rotation of rotor 11 consequently yields three full periods.

At maximum permissible field current Ie>>0, the maximum output voltage Ua1 in stator winding 13 is generated at a predefined load with the aid of the now twelve-pole rotor 11 using which the respective accumulator battery in the electrical system of a motor vehicle is to be supplied in a manner known per se via a rectifier unit. In a likewise known, but not depicted, manner, output voltage Ua of electric machine 10 is regulated downward to a greater or lesser degree as a function of the direct voltage in the motor vehicle electrical system. This means for electric machine 10 according to FIG. 1 that at a correspondingly reduced field current Ie>0 through stator winding 13, the correspondingly reduced output voltage Ua2 occurs, causing a weakening of the total magnetic field of rotor 11 due to the weaker electrical excitation in rotor 11. This weakening of the total field continues up to a field current Ie=0, at which only a relatively low output voltage Ua3 is induced in stator winding 13.

If the direction of field current Ie<0 in field coils 18 is now changed, a changeover of the number of poles on rotor 11 from twelve poles to four poles results according to FIG. 2. In this case oppositely directed voltages are induced in the individual coils of a phase winding of stator winding 13 which partially more or less cancel each other out. Output voltage Ua4 occurring here is now moving within a small range around voltage value 0. If field current Ie is ultimately increased in the opposite direction to higher values Ie>>0, an output voltage Ua5 is obtained, depicted in FIG. 5 with a dashed line, having half-waves of output voltage Ua which are electrically offset by 180°. If the machine is used in operation on a constant voltage system for regulating the reactive power, it means that, for the reactive power regulation, the induced voltage must be regulatable between a maximum and a minimum; it may not be 0 or become negative; otherwise the machine enters an unstable state.

Further exemplary embodiments of synchronous machines according to FIG. 1 having hybrid-excited and pole-changing rotors according to the present invention are schematically shown in FIGS. 6 through 9.

Figure 6A:
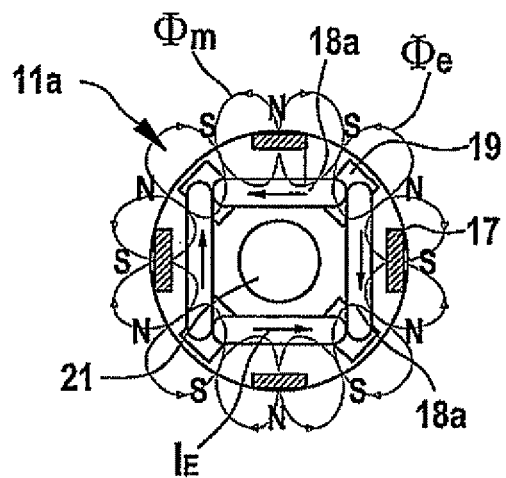
FIG. 6a and FIG. 6b show the rotor from FIG. 3 having divided field coils and the electrical changeover between twelve and four poles.
Figure 6B:
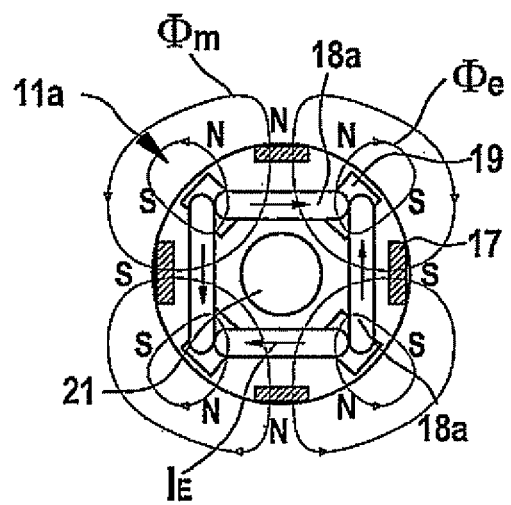

FIGS. 6a and 6b show a rotor 11a in cross section in which the two field coils 18 from FIG. 3 are replaced by four field coils 18a, each having half the number of windings, which are evenly distributed over the circumference. The direction of current in field coils 18a is indicated by arrows. According to FIG. 6a, this results in a twelve-pole arrangement on the rotor circumference in cooperation of permanent magnets 17 with field coils 18a and, according to FIG. 6b, in a four-pole configuration on the rotor circumference due to the change of direction of the current in field windings 18a. For both numbers of poles, the sequence of poles over the rotor circumference remains symmetrical, whereby a uniform magnetic and thermal load of the rotor is ensured.

Figure 7A:
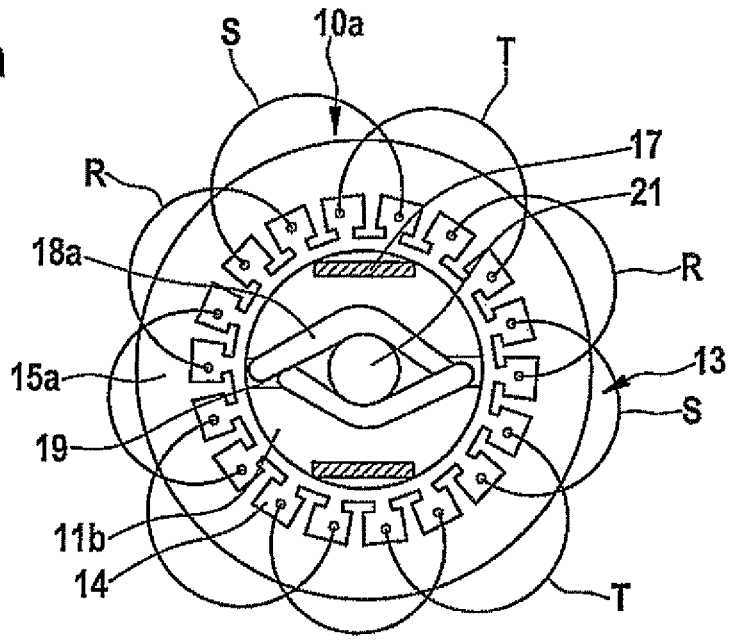
FIG. 7a, FIG. 7b, and FIG. 7c show in another specific embodiment a machine having a rotor changeable between six and two poles, having two permanent magnets and one divided field coil.
Figure 7B:
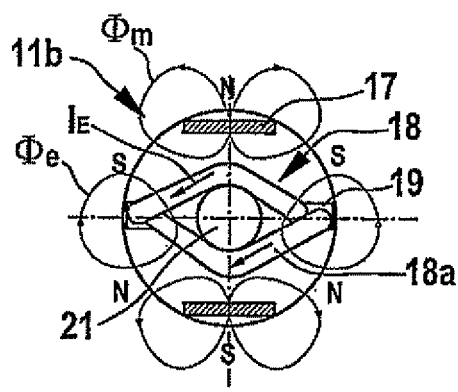
Figure 7C:
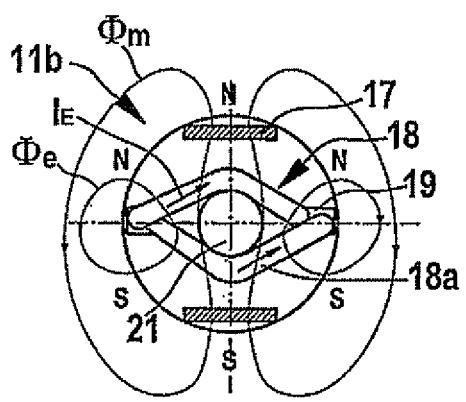

FIGS. 7a, 7b, and 7c schematically show in cross section a machine 10a having a rotor 1ib which has only one field coil 18, which is divided into two halves 18a at the winding overhangs and is inserted into two diametrically opposite grooves 19 of rotor 11. The two parts 18a of field coil 18 are wound on the winding overhangs around a rotor shaft 21. In addition, two permanent magnets 17 having an alternating, radial polarity are situated on the circumference of rotor 12 offset by 90° with respect to the two grooves 19 of field coil 18.

In this embodiment according to FIG. 7a, laminated stator core 15a of machine 10 has grooves 14 on inner circumference 18 into which a stator winding 13, having three phases R, S, T and a number of holes n=1, is inserted. For one groove per phase and pole, this results in that stator winding 13 has a six-pole configuration. According to FIG. 7b, the direction of current in the two halves 18a of field coil 18 results in the formation of six almost equally strong poles of alternating polarity on the rotor circumference. If the direction of current in field coil 18 is reversed, magnetic flux $\Phi_e$, electrically excited thereby, also changes its direction so that, according to FIG. 7c, only two poles are formed on the rotor circumference which are distributed over half the circumference.

Figure 8A:
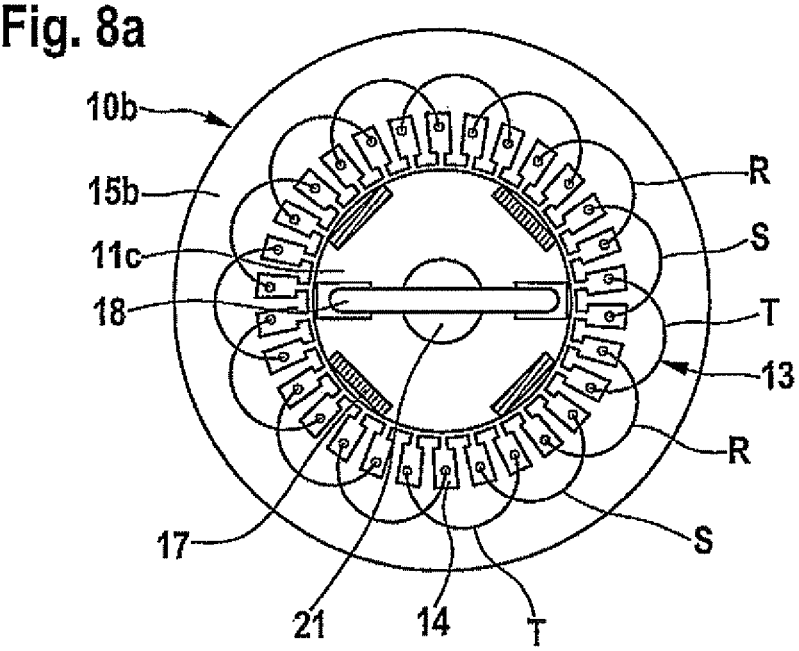
FIG. 8a, FIG. 8b, and FIG. 8c show in another exemplary embodiment a machine having a rotor changeable between ten and two poles, having four permanent magnets and only one field coil.
Figure 8B:
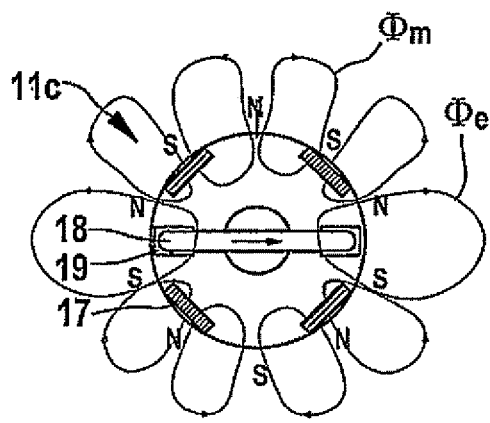
Figure 8C:
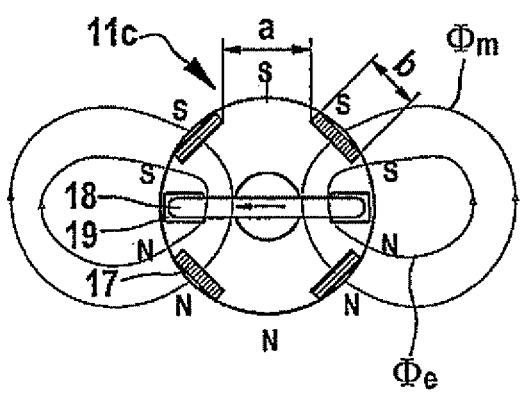

In a further exemplary embodiment according to FIGS. 8a, 8b, and 8c, only one field coil 18 on rotor 11c, which is inserted into diametrically opposite grooves 19, is shown which, for example, is to be wound around one half of the rotor shaft (not depicted) on its two winding overhangs. However, four permanent magnets 17 are situated here on the rotor circumference, two permanent magnets 17 having the same radial polarity being provided between the two grooves 19. Permanent magnets 17 are approximately equidistant to one another and to grooves 19 of rotor 11c.

In this embodiment according to FIG. 8a, laminated stator core 15b of machine 10b has grooves 14 on inner circumference 30 into which a stator winding 13 is inserted having three phases R, S, T and a number of holes n=1. With one groove per phase and pole, this results in that stator winding 13 has a ten-pole configuration. According to FIG. 8b, the depicted polarity of the four permanent magnets 17 and the direction of current in field coil 18, indicated by an arrow, result in a ten-pole formation of north and south poles of alternating pole sequence on the rotor circumference. According to FIG. 8c, this embodiment may be changed into a two-pole arrangement by changing the direction of current in field coil 18, the upper half of the rotor circumference being configured as a south pole and the lower half as a north pole.

Figure 9A:
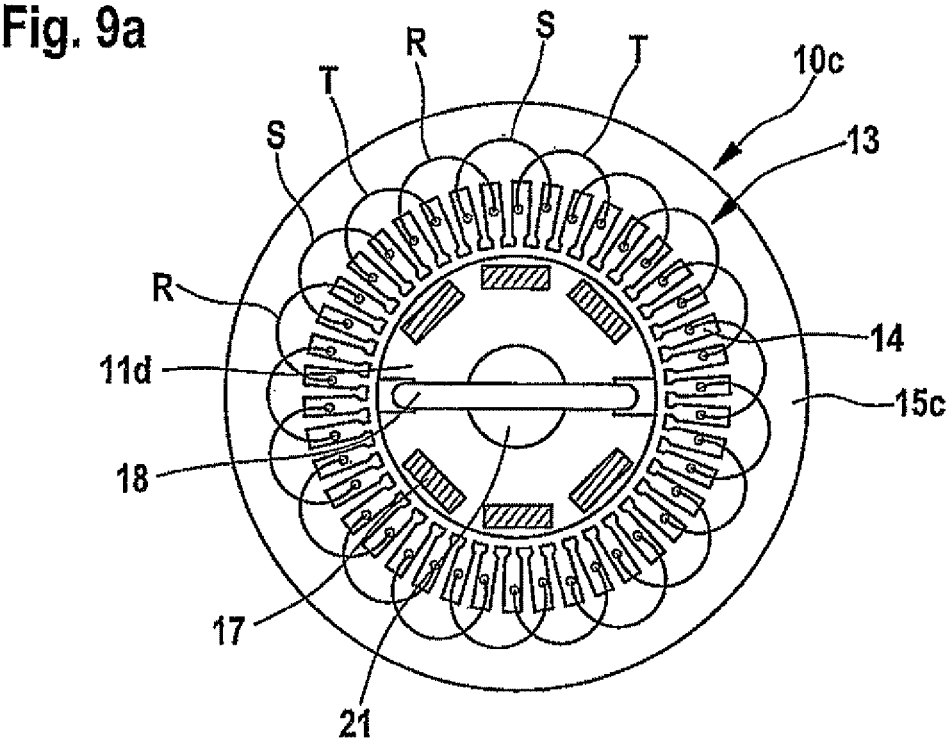
FIG. 9a, FIG. 9b, and FIG. 9c show in another exemplary embodiment a machine having a rotor changeable between fourteen and two poles, having six permanent magnets and only one field coil.
Figure 9B:
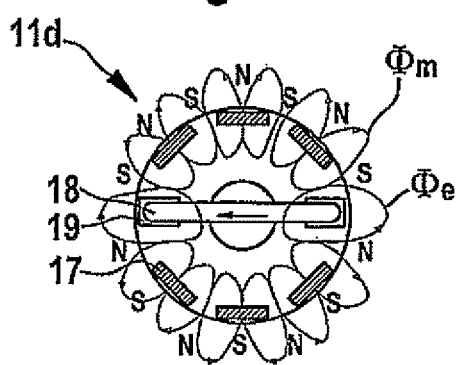
Figure 9C:
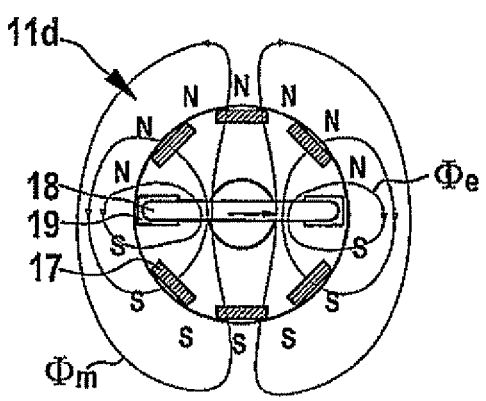

In another exemplary embodiment according to FIGS. 9a, 9b, and 9c, one field coil 18 is again inserted into two diametrically opposite grooves of a rotor lid. However, here six permanent magnets 17 are situated on the rotor circumference in such a way that, between grooves 19, three permanent magnets 17 having the same polarity are equidistant to one another and to the grooves. In this embodiment according to FIG. 9a, laminated stator core 15c of machine 10c has grooves 14 on inner circumference 42 into which a stator winding 13, having three phases R, S, T and a number of holes n=1, is inserted. With one groove per phase and pole, this results in that stator winding 13 has a fourteen-pole configuration. Here also, by changing the direction of current in field coil 18, indicated by arrows, the number of poles on the rotor circumference is changed. At the predefined direction of current according to FIG. 9b, this results in a fourteen-pole formation on the rotor circumference having approximately equally strong poles of alternating polarity. If the direction of current in field coil 18 is reversed according to FIG. 9c, the polarity of the electrically excited poles on both sides of grooves 19 is now reversed and a two-pole symmetrical configuration is obtained having a north pole on the upper half of the rotor circumference and a south pole on the lower half.

In the exemplary embodiments according to FIGS. 6 through 9, the formation of the magnetic field over the rotor circumference is depicted by a corresponding flux distribution characteristic, the magnetic flux of permanent magnets 17 being labeled with $\Phi_m$ and the electrically excited magnet flux being labeled with $\Phi_e$. Moreover, in the exemplary embodiments for achieving what may be a uniform pole distribution on the rotor circumference, it is important for the higher number of poles of rotor 11 that permanent magnets 17 have a circumferential distance a to one another and to the adjacent grooves 19 which corresponds to circumferential width b of permanent magnets 17.

By placing the radially magnetized permanent magnets 17 on the circumference of rotor 11 it is possible to magnetize them in the assembled state of the rotor in a simple way. Since the same number of north and south poles is present, the magnetic flux through the permanent magnets cancels itself out during the magnetizing process with the aid of a magnetizing device which is attached from the outside to the rotor circumference. In addition, since the north poles have a large distance to the south poles, they may very well be magnetized over their entire width up to their edges, the field lines having no interfering stray fluxes at the pole edges during the magnetizing process. By placing field coils 18 radially underneath permanent magnets 17 it is even possible to carry out the magnetization of permanent magnets 17 with the aid of current impulses in field coil 18.

Figure 10:
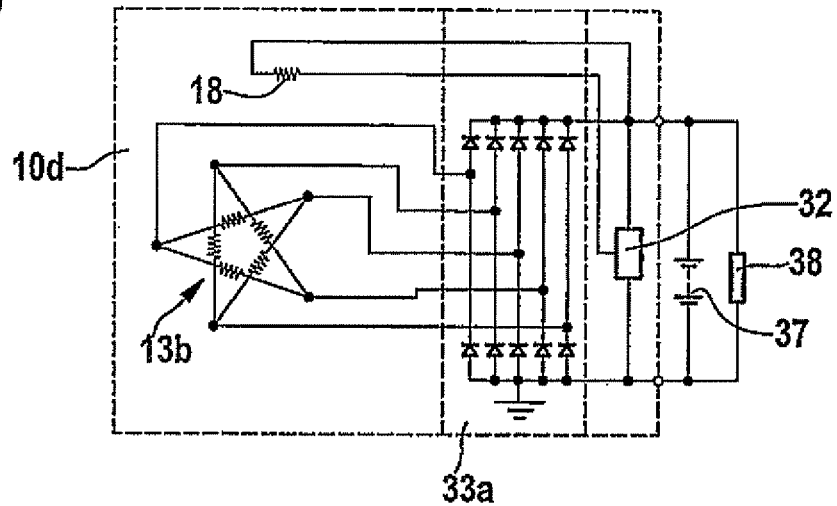
FIG. 10, FIG. 11, and FIG. 12 show further variants of the stator winding and its wiring.
Figure 11:
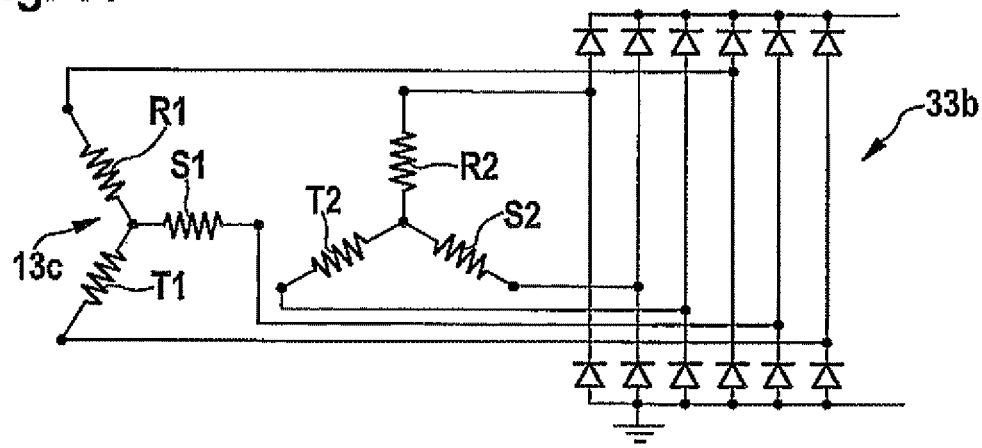
Figure 12:
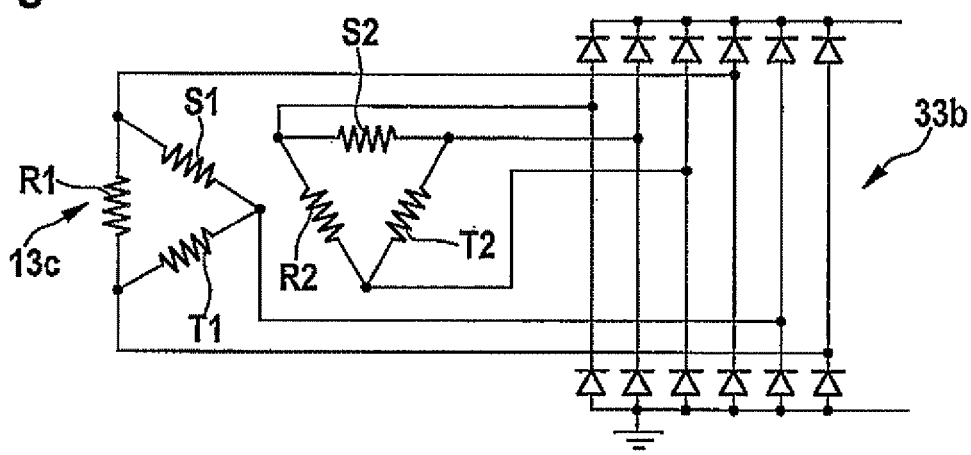

Additional variants of stator winding 13 of electric machine 10 and their connection to bridge rectifier 33 are shown in FIGS. 10, 11, and 12. According to FIG. 10, machine 10d is equipped with a five-phase stator winding 13b whose five phase windings are connected to one another to form a so-called star-series connection. A real star connection or a ring-series connection may also be considered instead. The five outputs of stator winding 13b are each connected to an input of the five diode bridges of bridge rectifier 33a. Here also, regulator 32 is connected to the output of bridge rectifier 33a for supplying field coil 18.

According to FIGS. 11 and 12, stator winding 13c of the machine has a six-phase configuration, the six phase windings R1, S1, T1, and R2, S2, T2 being connected to form a double star connection according to FIG. 11. The six outputs of stator winding 13c are each connected here to an input of the six diode bridges of bridge rectifier 33b. According to FIG. 12, the six phase windings R1, S1, T1, and R2, S2, T2 are connected to form a double delta connection, the six outputs of stator winding 13c being each connected here also to an input of the six diode bridges of bridge rectifier 33b.

The present invention is not restricted to the shown and described exemplary embodiments; a high number of poles may be implemented in particular in larger and high-performance machines having a hybrid-excited rotor by using a higher number of field coils 18 and permanent magnets 17. On fixed a.c. systems or three-phase systems, machines of this type may be used for regulating the reactive power via the field current as well as for changing the rotational speed. It is possible for example in an electric machine whose stator winding is changeable between two and six poles to increase the machine rotational speed three-fold or to reduce it to one third. In electric machines of this type which run in motor operation with a converter or an inverter it is possible to weaken the field by controlling the field current on. rotor 11, which results in an increase in the rotational speed provided the switching rate of the converter is increased via a feedback.

In all specific embodiments of the present invention, field coils 18 are situated on the circumference of rotor 11 with a step size SW which corresponds to the pole pitch Pt of the respective lower number of poles.

Permanent magnets 17 are designed as flat magnets, shell-type magnets, or as so-called bread loaf magnets and are situated on the rotor circumference, where they are, according to FIGS. 1 and 2 for example, mounted in appropriate recesses of rotor 11 or, according to FIGS. 4 through 7, are axially inserted in appropriate slots tangentially situated on the rotor circumference.

For obtaining higher numbers of poles, the pattern in the rotor may be repeated. For example, the arrangement according to FIGS. 6a and 6b is the doubling of the arrangement in FIGS. 7b and 7c.

What is claimed is:

1. An electric machine, comprising:
   a fixed stator, which carries a multi-phase stator winding;
   a rotor, which cooperates with the stator via an operating air gap, and which has multiple poles over its circumference in a predefined sequence which are excited by permanent magnets and by at least one field coil;
   wherein the number of poles of the rotor is changeable as a function of an intensity and a direction of a field current in the at least one field coil, wherein the rotor has a core which is a laminated core laminated in the axial direction which is provided with grooves on its circumference for accommodating the at least one field coil and the at least one field coil, having a step size which corresponds to a pole pitch of the lower number of poles, is situated on the circumference of the rotor,
   wherein winding overhangs of the at least one field coil pass by below at least one radially magnetized permanent magnet situated on the rotor circumference, on the faces of the laminated core in a chord-like manner, and
   wherein the rotor has only one field coil, inserted into grooves diametrically opposite one another, which is wound around a rotor shaft split at the winding overhangs and cooperates with at least two permanent magnets situated between the grooves on the rotor circumference diametrically opposite one another.

2. The electric machine of claim 1, wherein the electric machine is a multi-phase a.c. generator for a motor vehicle, and wherein the output voltage of the stator winding is regulatable as a function of load and temperature between a permissible maximum value and a minimum value by changing the intensity and the direction of the field current in the field coil.

3. The electric machine of claim 1, wherein two permanent magnets of alternating polarity are offset by 90° with respect to the two grooves of the field coil.

4. The electric machine of claim 3, wherein four permanent magnets are situated on the rotor circumference, two magnets of the same radial polarity between the grooves being approximately equidistant to one another and to the grooves.

5. The electric machine of claim 3, wherein six permanent magnets are situated on the rotor circumference, three magnets of the same radial polarity between the grooves being approximately equidistant to one another and to the grooves.

6. The electric machine of claim 1, wherein there are four permanent magnets that have a circumferential distance to the adjacent grooves which corresponds to the circumferential width of the magnets so that, at an appropriate field current in the field coils, the magnet poles on the rotor circumference are changeable from a higher number of poles to a lower number of poles.

7. The electric machine of claim 1, wherein the number of poles of the multi-phase stator winding corresponds to the higher number of poles of the changeable rotor.

8. The electric machine of claim 1, wherein the stator winding has a three-phase configuration and is connected to the input of a bridge rectifier via a star or delta connection.

9. The electric machine of claim 8, wherein the output of the bridge rectifier is connected to a regulator whose output is connected to the at least one field coil of the rotor, the regulator being able to change the intensity and the direction of the field current as a function of the output voltage across the bridge rectifier.

10. The electric machine of claim 1, wherein the stator winding has a five-phase configuration and is connected to the input of a bridge rectifier via one of a star connection, a ring connection, and a star-series connection.

11. The electric machine of claim 1, wherein the stator winding has a six-phase configuration and is connected to the input of a bridge rectifier via one of a double star connection and a double delta connection.

12. The electric machine of claim 1, wherein a fan is situated on each of the two faces of the rotor's laminated core.

13. The electric machine of claim 1, wherein winding overhangs of the at least one field coil pass by below at least one radially magnetized permanent magnet situated on the rotor circumference, on the faces of the laminated core in a chord-like manner.

14. The electric machine of claim 1, wherein, in normal operation of the machine, the rotor has a higher number of poles, the intensity and the direction of the field current in the at least one field coil being selected so that, in cooperation with the permanent magnets, poles having approximately the same intensity and alternating polarity appear on the rotor circumference.

15. An electric machine, comprising:
    a fixed stator, which carries a multi-phase stator winding; and
    a rotor, which cooperates with the stator via an operating air gap and which has multiple poles over its circumference in a predefined sequence which are electrically excited by permanent magnets and by at least one field coil;
    wherein the number of poles of the rotor is changeable as a function of an intensity and a direction of a field current in the at least one field coil, wherein the rotor has a core which is a laminated core laminated in the axial direction which is provided with grooves on its circumference for accommodating the at least one field coil and the at least one field coil, having a step size which corresponds to a pole pitch of the lower number of poles, is situated on the circumference of the rotor, and
    wherein the rotor has only one field coil, inserted into grooves diametrically opposite one another, which is wound around a rotor shaft split at the winding overhangs and cooperates with at least two permanent magnets situated between the grooves on the rotor circumference diametrically opposite one another.

16. The electric machine of claim 15, wherein two permanent magnets of alternating polarity are offset by 90° with respect to the two grooves of the field coil.

17. The electric machine of claim 16, wherein four permanent magnets are situated on the rotor circumference, two magnets of the same radial polarity between the grooves being approximately equidistant to one another and to the grooves.

18. The electric machine of claim 16, wherein six permanent magnets are situated on the rotor circumference, three magnets of the same radial polarity between the grooves being approximately equidistant to one another and to the grooves.

19. The electric machine of claim 15, wherein the number of poles of the multi-phase stator winding corresponds to the higher number of poles of the changeable rotor.

20. The electric machine of claim 15, wherein winding overhangs of the at least one field coil pass by below at least one radially magnetized permanent magnet situated on the rotor circumference, on the faces of the laminated core in a chord-like manner.

21. The electric machine of claim 15, wherein there are four permanent magnets having a circumferential distance to the adjacent grooves which corresponds to the circumferential width of the magnets, so that, at an appropriate field current in the field coils, the magnet poles on the rotor circumference are changeable from a higher number of poles to a lower number of poles.

22. The electric machine of claim 15, wherein the number of poles of the multi-phase stator winding corresponds to the higher number of poles of the changeable rotor.

23. The electric machine of claim 15, wherein the stator winding has a three-phase configuration and is connected to the input of a bridge rectifier via a star or delta connection.

24. The electric machine of claim 15, wherein the stator winding has a five-phase configuration and is connected to the input of a bridge rectifier via one of a star connection, a ring connection, and a star-series connection.

25. The electric machine of claim 15, wherein the stator winding has a six-phase configuration and is connected to the input of a bridge rectifier via one of a double star connection and a double delta connection.

26. The electric machine of claim 15, wherein the output of the bridge rectifier is connected to a regulator whose output is connected to the at least one field coil of the rotor, the regulator being able to change the intensity and the direction of the field current as a function of the output voltage across the bridge rectifier.

27. The electric machine of claim 15, wherein a fan is situated on each of the two faces of the rotor's laminated core.

28. An electric machine, comprising:
a fixed stator, which carries a multi-phase stator winding;
a rotor, which cooperates with the stator via an operating air gap, and which has multiple poles over its circumference in a predefined sequence which are excited by permanent magnets and by at least one field coil;
wherein the number of poles of the rotor is changeable as a function of an intensity and a direction of a field current in the at least one field coil, wherein the rotor has a core which is a laminated core laminated in the axial direction which is provided with grooves on its circumference for accommodating the at least one field coil, and the at least one field coil having a step size which corresponds to a pole pitch of the lower number of poles, is situated on the circumference of the rotor,
wherein in normal operation of the machine, the rotor has a higher number of poles, the intensity and the direction of the field current in the at least one field coil being selected so that, in cooperation with the permanent magnets, poles having approximately the same intensity and alternating polarity appear on the rotor circumference,
wherein the number of poles of the multi-phase stator winding corresponds to the higher number of poles of the changeable rotor, and
wherein the rotor has only one field coil, inserted into grooves diametrically opposite one another, which is wound around a rotor shaft split at the winding overhangs and cooperates with at least two permanent magnets situated between the grooves on the rotor circumference diametrically opposite one another.

29. The electric machine of claim 28, wherein two permanent magnets of alternating polarity are offset by 90° with respect to the two grooves of the field coil.

30. The electric machine of claim 29, wherein four permanent magnets are situated on the rotor circumference, two magnets of the same radial polarity between the grooves being approximately equidistant to one another and to the grooves.

31. The electric machine of claim 29, wherein six permanent magnets are situated on the rotor circumference, three magnets of the same radial polarity between the grooves being approximately equidistant to one another and to the grooves.

* * * * *